US011976603B2

(12) United States Patent
Wilhelmsson et al.

(10) Patent No.: US 11,976,603 B2
(45) Date of Patent: May 7, 2024

(54) DEVICE AND METHOD IN CONNECTION WITH A PRE-HEATING PROCESS OF AN AFTERTREATMENT SYSTEM

(71) Applicant: Volvo Truck Corporation, Gothenburg (SE)

(72) Inventors: Martin Wilhelmsson, Gothenburg (SE); Dan Stenqvist, Västra Frölunda (SE); Irman Svraka, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/098,907

(22) Filed: Jan. 19, 2023

(65) Prior Publication Data

US 2023/0235711 A1 Jul. 27, 2023

(30) Foreign Application Priority Data

Jan. 24, 2022 (EP) .................................... 22153032

(51) Int. Cl.
*F02D 41/02* (2006.01)
*F01N 3/20* (2006.01)
(Continued)

(52) U.S. Cl.
CPC ......... *F02D 41/024* (2013.01); *F02D 41/062* (2013.01); *F01N 3/2006* (2013.01); *F01N 2410/06* (2013.01); *F01N 2900/04* (2013.01); *F01N 2900/0412* (2013.01); *F01N 2900/0418* (2013.01); *F01N 2900/0421* (2013.01); *F01N 2900/0422* (2013.01); *F01N 2900/1404* (2013.01); *F01N 2900/1626* (2013.01); *F02D 2200/0802* (2013.01); *F02D 2250/36* (2013.01); *F02N 11/0855* (2013.01); *F02N 2200/026* (2013.01)

(58) Field of Classification Search
CPC combination set(s) only.
See application file for complete search history.

(56) References Cited

U.S. PATENT DOCUMENTS 5,163,290 A 11/1992 Kinnear
5,398,747 A * 3/1995 Miaoulis ............... F01N 3/2882
62/480

(Continued)

OTHER PUBLICATIONS

Extended European Search Report, European Application 22153032.2 dated Jul. 6, 2022, 8 pages.

*Primary Examiner* — Binh Q Tran
(74) *Attorney, Agent, or Firm* — Sage Patent Group

(57) ABSTRACT

A method performed by a control unit in connection with a pre-heating process of an aftertreatment system for a combustion engine is provided. The control unit obtains a scheduled start time of the combustion engine. The control unit schedules a pre-heating of the aftertreatment system to be completed before the scheduled start time. The control unit detects a start of the combustion engine at an actual start time. In response to the detected start of the combustion engine, and using the actual and scheduled start times, the control unit determines whether the scheduled pre-heating of the aftertreatment system fulfils one or more success criteria. When the one or more success criteria are fulfilled, the control unit triggers a performance increase of the combustion engine.

15 Claims, 3 Drawing Sheets

(51) Int. Cl.
*F02D 41/06* (2006.01)
*F02N 11/08* (2006.01)

(56) References Cited

U.S. PATENT DOCUMENTS

| | | | | |
|---|---|---|---|---|
| 9,074,509 | B2 * | 7/2015 | Takara | F01N 13/009 |
| 2010/0212981 | A1 * | 8/2010 | Roos | B60W 30/192<br>903/930 |
| 2012/0247084 | A1 * | 10/2012 | Atluri | F01N 9/00<br>60/274 |
| 2018/0340480 | A1 * | 11/2018 | Mehta | F01N 3/2013 |
| 2020/0063626 | A1 * | 2/2020 | Dudar | F01N 11/00 |
| 2020/0102874 | A1 * | 4/2020 | Kurtz | F02D 41/1441 |

* cited by examiner

DEVICE AND METHOD IN CONNECTION WITH A PRE-HEATING PROCESS OF AN AFTERTREATMENT SYSTEM

CROSS REFERENCE TO RELATED APPLICATIONS

This application claims priority to European Application No. 22153032.2 filed on Jan. 24, 2022, the disclosure and content of which is incorporated by reference herein in its entirety.

TECHNICAL FIELD

The present disclosure relates to a method and device in connection with a pre-heating process of an aftertreatment system for a combustion engine in a vehicle. While the disclosure is described with respect to pre-heating an aftertreatment system of a combustion engine in a vehicle, the scope of the present disclosure is also applicable in the context of any pre-heating process of aftertreatment systems.

BACKGROUND

Pre-heating of aftertreatment systems is becoming increasingly important for optimizing emission performance and fuel economy of combustion engines, such as in vehicles. For example, an exhaust aftertreatment system (EATS) can be electrically heated prior to an engine start in order to enhance nitrogen oxide (NOx) conversion and to reduce cold start emissions. If the EATS is warm when the engine is started, it is possible to run the engine in a fuel economic mode which reduces fuel consumption. If the EATS is cold or not sufficiently warm when the engine is started, the fuel consumption may be high and the engine may produce exhaust gases with an excessive amount of particles and NOx which cannot be removed from the exhaust gases properly. Furthermore, driving with a cold EATS may increase an overall strain on the engine which may reduce the engine lifetime and/or performance. When the EATS is pre-heated for a too long time before vehicle departure, energy and fuel are wasted for keeping the EATS warm during the time the vehicle is not driving. When the EATS is not heated at all, or not heated sufficiently before the vehicle departure, the engine of the vehicle is cold started, thereby producing excess cold start emissions and operating with poor fuel consumption.

Hence, there is an ongoing strive to improve pre-heating of aftertreatment systems, and thereby improving fuel economy and reducing cold start emissions.

SUMMARY

An object of the invention is to provide in at least some aspect improved method for reducing waste of fuel and energy, and/or for reducing cold start emissions in exhaust gases produced by combustion engines.

According to a first aspect, the above object is achieved by a method according to claim 1. Hence, there is provided a method performed by a control unit in connection with a pre-heating process of an aftertreatment system for a combustion engine. The method comprises:

Obtaining a scheduled start time of the combustion engine. The scheduled start time of the combustion engine may, for example, correspond to, or be determined from, a scheduled vehicle departure time of a vehicle in which the combustion engine is comprised.

Scheduling a pre-heating of the aftertreatment system to be completed before the scheduled start time.

Detecting a start of the combustion engine at an actual start time. Detecting the start of the combustion engine may, for example, comprise detecting a departure of the vehicle at an actual vehicle departure time, which may in that case be determined as the actual start time.

In response to the detected start of the combustion engine, and using the actual and scheduled start times, determining whether the scheduled pre-heating of the aftertreatment system fulfils one or more success criteria. Determining whether the scheduled pre-heating of the aftertreatment system fulfils one or more success criteria may, for example, be performed in response to the detected departure of the vehicle, and using the actual and scheduled vehicle departure times.

When the one or more success criteria are fulfilled, triggering a performance increase of the combustion engine.

By defining one or more success criteria and ensuring that they are fulfilled, the aftertreatment system is pre-heated accurately and thus reduces cold start emissions and waste of fuel and energy. The aftertreatment system may now operate in an efficient manner, and as a consequence, a performance increase of the combustion engine may be triggered. This is since when the aftertreatment system is pre-heated, the combustion engine is enabled to operate using the performance increase without producing increased exhaust emissions. In other words, the triggered performance increase may correspond to a performance benefit caused by pre-heating the aftertreatment system. Furthermore, the performance increase may incentivize a user, e.g. a driver, to schedule and complete pre-heating of the aftertreatment system before the actual start time of the combustion engine or the actual vehicle departure time. Additionally, when it is needed to achieve a performance target, the performance increase may be necessary to trigger and hence, to achieve the performance target, the aftertreatment system needs to be pre-heated which thus reduces cold start emissions.

Optionally, the one or more success criteria may be one or more predefined success criteria.

Optionally, the one or more success criteria comprise at least one of:

a temperature of the aftertreatment system is above a predetermined threshold temperature at the actual start time, and the actual start time is later than or coincides with the scheduled start time.

Optionally, triggering the performance increase may comprise triggering any one or more out of:

an increase of engine power, an increase of engine speed, and an increase of engine torque.

Optionally, the method may further comprise:

Obtaining pre-heating statistics indicating whether or not the one or more success criteria was fulfilled at one or more previous starts of the combustion engine. Triggering the performance increase may further be based on the obtained pre-heating statistics.

Optionally, the pre-heating statistics comprises any one or more out of:

one or more previous scheduled start times, one or more previous actual start times, and one or more previous temperatures of the aftertreatment system at respective actual start times.

Optionally, the pre-heating statistics may further comprise information about a share of pre-heating processes of the aftertreatment system fulfilling the one or more success criteria at the one or more previous starts of the combustion engine. The pre-heating statistics may be able to track to which extent pre-heating of the aftertreatment system has been successfully completed during the one or more previous starts of the combustion engine.

Optionally, the method may further comprise logging whether or not the one or more success criteria are fulfilled.

Optionally, logging whether or not the one or more success criteria are fulfilled may further comprise logging any one or more out of:

the scheduled start time, the actual start time, and the temperature of the aftertreatment system at the actual start time.

Optionally, obtaining the scheduled start time may comprise receiving the scheduled start time from a wireless device. The wireless device may be a mobile phone.

According to a second aspect, there is provided a control unit configured to perform the method according to the first aspect. The control unit may be an electronic control unit.

According to a third aspect, there is provided a vehicle comprising a control unit according to the second aspect, a combustion engine, and an aftertreatment system.

Optionally, the aftertreatment system is arranged to reduce particles and/or NOx emissions of exhaust gases produced by the combustion engine.

Optionally, the vehicle is any one out of a truck, a car, a bus, and a construction equipment vehicle, such as an excavator, wheel loader, articulated hauler, rigid hauler, asphalt paver, compactor, pipelayer or demolition equipment.

According to a fourth aspect, there is provided a computer program comprising program code means for performing the method of the first aspect, when said program is run on a computer. The computer may be the control unit according to the second aspect.

According to a fifth aspect, there is provided a computer readable medium carrying a computer program comprising program code means for performing the method of the first aspect, when said program is run on a computer. The computer may be the control unit according to the second aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
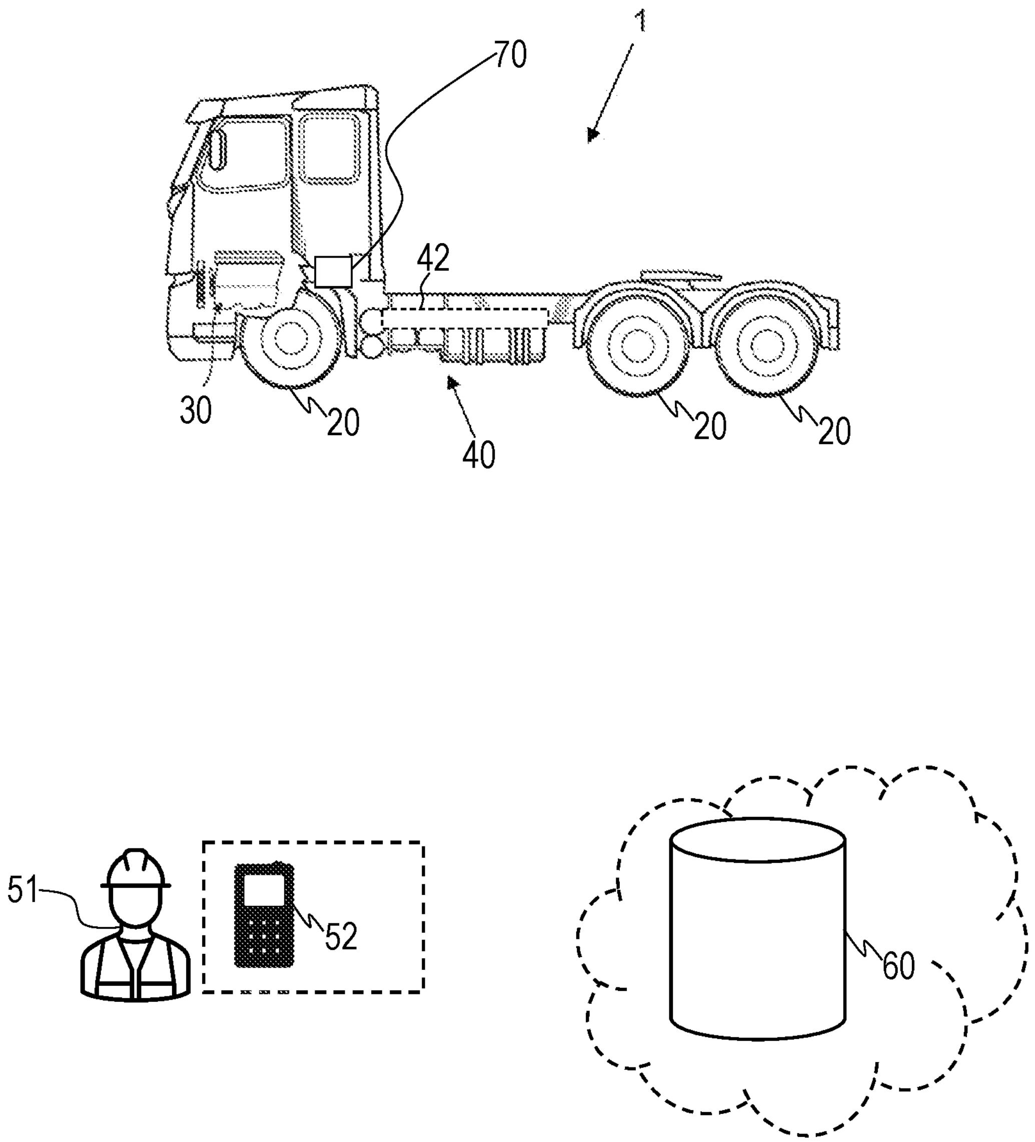
FIG. 1 is a vehicle according to embodiments herein.

FIG. 1. is a schematic overview of a vehicle 1 in accordance with embodiments herein. The vehicle 1 comprises a combustion engine 30 for driving the vehicle 1. The vehicle 1 comprises an exhaust aftertreatment system 40 for reducing harmful exhaust emissions of the combustion engine 30, e.g., reducing particles and NOx of exhaust gases produced by the combustion engine 30 and e.g., released as cleaned exhaust gases through an exhaust pipe (not shown). The aftertreatment system 40 may also be referred to as an EATS. In other words, the aftertreatment system 40 may be a device that cleans exhaust gases produced by the combustion engine 30 to ensure that harmful emissions are minimized or at least reduced. The aftertreatment system 40 may reduce harmful exhaust emissions by any suitable mechanism, e.g., by converting Carbon Monoxide (CO), hydrocarbons (HC), NOx and other potentially harmful chemicals, this may e.g., involve converting NOx using a reductant, such as urea, in a Selective Catalytic Reduction (SCR) unit. The aftertreatment system 40 may additionally or alternatively further clean exhaust gases by removing soot in a particulate filter unit, such as a Diesel Particulate Filter (DPF) unit and/or by converting CO/HC in an oxidation catalyst unit, such as a Diesel Oxidation Catalyst (DOC) unit. When the aftertreatment system 40 is warm, a more efficient handling of emissions produced by the combustion engine 30 is achieved. A warm aftertreatment system 40 may additionally enable the combustion engine 30 to operate in a more fuel-efficient manner and may also reduce degradation of components of the vehicle 1. When the aftertreatment system 40 is too cold, e.g., lower than a threshold temperature, the aftertreatment system 40 may not clean exhaust gases at all or at best at a minimum efficiency. This is due to that the cleaning of exhaust gases by the aftertreatment system 40 is highly dependent on the temperature of the aftertreatment system 40. For example, when the temperature of the aftertreatment system 40 is below 100 degrees Celsius (C), the NOx conversion within the SCR unit is typically non-existing. When the temperature of the aftertreatment system 40 is 150° C., about 50% of NOx in the exhaust gases may be converted. For most efficient conversion of exhaust gases, the aftertreatment system 40 needs to be heated to above 200° C. For example, when the aftertreatment system 40 is heated to a temperature between 200° C. and 250° C., 95-99%, or sometimes up to 100% of all NOx may be converted in the exhaust gases produced by the combustion engine 30.

To ensure that the aftertreatment system 40 is sufficiently warm, e.g., between 200-250° C., in time before starting the combustion engine 30, the aftertreatment system 40 may be pre-heated using a pre-heating unit 42. The pre-heating unit 42 may heat the aftertreatment system 40 using any suitable mechanism using any suitable energy source. For example, the pre-heating unit 42 may be arranged to pre-heat the aftertreatment system 40 using e.g., electrical energy from a battery in the vehicle 1. The battery may be arranged to be charged using braking energy, e.g., generated by braking one or more wheels 20 and/or by engine braking. In this way, the energy of pre-heating the aftertreatment system 40 would be emission neutral. The energy could also come from an electrical grid, e.g., by the vehicle 1 being connected to an electricity outlet. The energy for charging the battery may also be provided from the combustion engine 30. The vehicle 1 is in the scenario of FIG. 1 illustrated as a truck, but the vehicle 1 may also be any other suitable vehicle such as a car, a bus, a construction equipment vehicle, such as an excavator, wheel loader, articulated hauler, rigid hauler, asphalt paver, compactor, pipelayer or demolition equipment, or any other suitable vehicle comprising a combustion engine and an aftertreatment system, such as the combustion engine 30 and the aftertreatment system 40.

Embodiments herein may be performed by a control unit 70. The control unit 70 may be comprised in the vehicle 1 but may also be comprised in any other suitable location. The control unit 70 may be communicatively connected with any one or more out of the aftertreatment system 40, the combustion engine 30, and the pre-heating unit 42. The control unit 70 may for example be arranged to schedule and/or perform pre-heating of the aftertreatment system 40. The control unit 70 may further be arranged to trigger a performance increase of the combustion engine 30 when a pre-heating process of the aftertreatment system 40 fulfils one or more success criteria. The control unit 70 may further be able to obtain and/or log any suitable parameter or statistics related to the operation of the vehicle 1 and/or relating to a pre-heating process of the aftertreatment system 40.

The control unit 70 may be arranged to receive input from a user 51, e.g., a driver, e.g. via a user interface and/or via a wireless device 52 e.g. operated by the user 51. The wireless device 52 may be any suitable wireless device that can communicate with the control unit 70 using any suitable means. The wireless device 52 may e.g., be any one out of a mobile phone, a user equipment (UE), a computer, a laptop, another vehicle, or any other suitable device with networking or other remote communication capabilities. The input may be any suitable input, e.g., relating to a scheduled start time of the combustion engine 30 or a scheduled departure time of the vehicle 1.

A storage medium 60, e.g., a database, may be arranged in connection with the control unit 70, e.g., for logging any one out of: pre-heating statistics, time schedules for pre-heating the aftertreatment system 40, and any other suitable parameters related to a pre-heating process of the aftertreatment system 40. The storage medium 60 may be comprised in the vehicle 1, e.g., directly connected with the control unit 70, or arranged at a remote location, e.g., in a cloud environment.

Figure 2:
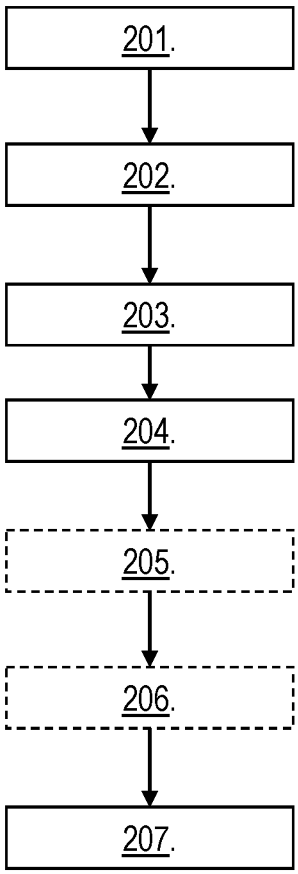
FIG. 2 is a flowchart illustrating a method according to embodiments herein.

FIG. 2 illustrates example embodiments of a method performed by the control unit 70 in connection with a pre-heating process of the aftertreatment system 40 for the combustion engine 30. The method described in relation to FIG. 2. may in some embodiments be a part of the pre-heating process of the aftertreatment system 40. The method comprises the following actions described below, which actions may be taken in any suitable order. Optional actions are indicated by dashed boxes in FIG. 2.

Action 201. The method may start by obtaining a scheduled start time of the combustion engine 30. The start time of the combustion engine 30 may correspond to a scheduled departure time of the vehicle 1 or be determined from the scheduled departure time. For example, if the scheduled departure time is known, the scheduled start time may be obtained by assuming that the scheduled start time coincides with the scheduled departure time, or that it occurs at a predetermined time before the scheduled departure time. The scheduled start time may be inputted by the user 51. In some embodiments, the user 51 inputs the scheduled start time in a user interface of the control unit 70, e.g. arranged in the vehicle 1. In some embodiments, obtaining the scheduled start time comprises receiving the scheduled start time from the wireless device 52, e.g. wherein the scheduled start time is inputted on the wireless device 52 by the user 51. The scheduled start time may be for a specific time or may comprise a series of times, e.g. a schedule comprising recurring times such as a fixed time every weekday. For example, the user 51 may proactively enter information about when in time the user 51 is to depart with the vehicle 1, i.e., the above-mentioned scheduled start time.

Action 202. The method proceeds by scheduling a pre-heating of the aftertreatment system 40 to be completed before the scheduled start time. The pre-heating of the aftertreatment system 40 may thus be initiated at a suitable time before the scheduled start time. The pre-heating may be scheduled to pre-heat the aftertreatment system 40 to a temperature above 200° C., e.g. to a temperature of 200-250° C.

Action 203. The method further comprises detecting a start of the combustion engine 30 at an actual start time. The actual start time may be a departure time of the vehicle 1. In this way it is possible to determine how accurate the pre-heating of the aftertreatment system 40 performed.

Action 204. The method comprises, in response to the detected start of the combustion engine 30, and using the actual and scheduled start time, determining whether the scheduled pre-heating of the aftertreatment system 40 fulfils one or more success criteria.

The one or more success criteria may be pre-defined and comprise at least one of:

- a temperature of the aftertreatment system 40 is above a predetermined threshold temperature at the actual start time, e.g., above 200° C., and
- the actual start time is later than or coincides with the scheduled start time.

When the actual start time is later than or coincides with the scheduled start time, it may be assumed that the pre-heating of the aftertreatment system 40 has been completed before the actual start time.

When the one or more success criteria is/are fulfilled, it may be assumed that the aftertreatment system 40 is pre-heated correctly and will reduce cold start emissions when the combustion engine 30 starts.

To avoid wasting resources, e.g. fuel and energy, for keeping the aftertreatment system 40 warm for an excessive time before departure of the vehicle 1, the one or more success criteria may also be defined so as to be considered fulfilled when the actual start time of the combustion engine 30 is within a predefined time range after a pre-heating completion time. The pre-heating completion time may be the time when the pre-heating of the aftertreatment system 40 has completed successfully, e.g. when the temperature of the aftertreatment system 40 has exceeded the predetermined threshold temperature. The pre-heating completion time may, e.g., coincide with or occur before the scheduled start time. The time range may be set so that the aftertreatment system 40 is still warm when the combustion engine 30 is started, even if the actual start time is after the pre-heating completion time. The time range may also be set to limit a time for keeping the aftertreatment system 40 warm between a completed pre-heating of the aftertreatment system 40 and the actual start time.

Action 205. In some embodiments, the method comprises logging, e.g., to the storage medium 60, whether or not the one or more success criteria are fulfilled. In this way, it may be possible to further determine how well pre-heating of the aftertreatment system 40 is performing over time. In some embodiments, logging whether or not the one or more success criteria are fulfilled further comprises logging any one or more out of:

- the scheduled start time,
- the actual start time, and
- the temperature of the aftertreatment system 40 at the actual start time.

Action 206. In some embodiments, the method comprises obtaining pre-heating statistics indicating whether or not the one or more success criteria were fulfilled at one or more previous starts of the combustion engine 30. The pre-heating statistics may e.g., be obtained from the storage medium 60.

In some embodiments, the pre-heating statistics comprise any one or more out of:

- one or more previous scheduled start times,
- one or more previous actual start times, and
- one or more previous temperatures of the aftertreatment system 40 at respective actual start times.

In some embodiments, the pre-heating statistics further comprise information of a share of pre-heating processes of the aftertreatment system 40 fulfilling the one or more success criteria at the one or more previous starts of the combustion engine 30.

In other words, the pre-heating statistics may be able to track to which extent pre-heating of the aftertreatment system 40 has been successfully completed during the one or more previous starts of the combustion engine 30.

Action 207. The method comprises, when the one or more success criteria are fulfilled, triggering a performance increase of the combustion engine 30. The performance increase may be possible to trigger since the aftertreatment system 40 is pre-heated. Due to the pre-heating of the aftertreatment system 40, the combustion engine 30 may operate under better conditions which thus makes the combustion engine 30 capable of the increased performance without producing excessive exhaust emissions. The triggered performance increase may incentivize the user 51 to pre-heat the aftertreatment system 40. For example, the user 51 may need to operate the vehicle 1 at a target performance. To achieve the target performance, the vehicle 1 needs to operate using the performance increase, and thus, the aftertreatment system 40 needs to be scheduled for pre-heating, which thus reduces harmful exhaust cold-start emissions when operating the vehicle 1.

In some embodiments, triggering the performance increase comprises triggering any one or more out of:

- an increase of engine power,
- an increase of engine speed, and
- an increase of engine torque.

Alternatively, or additionally, any other suitable performance increases relating to the combustion engine 30 and/or the vehicle 1 may be triggered.

In some embodiments, triggering the performance increase is further based on the obtained pre-heating statistics. In this way, triggering the performance increase may be conditioned on that the one or more success criteria is/are fulfilled often and/or on a regular basis, e.g. by more than a predetermined success threshold. In other words, the performance increase may only be triggered if cold start emissions are minimized. When the aftertreatment system 40 is pre-heated and when the pre-heating statistics indicate that the one or more success criteria is/are fulfilled often and/or on a regular basis, it may be assumed that the combustion engine 30 is in a good condition and is capable of triggering the increased performance without producing excessive exhaust emissions. This further incentivizes the user 51 to keep pre-heating the aftertreatment system 40.

Above actions and embodiments will now be exemplified by embodiments below. Any embodiment or action above or below may when suitable be combined in any suitable manner.

Some embodiments herein relate to giving a performance increase incentive either for available engine power or maximum engine speed, when the user 51 has done a good job at proactively and correctly scheduling times for departure, e.g., a scheduled start time as in action 201 above. The maximum engine speed may e.g., limit a maximum speed at which the vehicle 1 can travel.

In some embodiments, the user 51 may want to depart before the scheduled start time. In these embodiments the performance increase may still be triggered, e.g. as in action 207 above, if the user 51 waits with starting the combustion engine 30 until the aftertreatment system 40 has had time to heat up sufficiently after the user 51 has powered on the vehicle 1. In this way, the aftertreatment system 40 is enabled to clean exhaust gases efficiently directly when the combustion engine 30 is started.

The enabled performance increase of embodiments herein, e.g., as described above in action 207, may act as an incentive for the user 51 to keep planning start times proactively as much as possible and/or to make sure to wait until the aftertreatment system 40 is warm before starting the combustion engine 30.

EXAMPLE SCENARIO

An example scenario of embodiments herein may involve the following steps:

1. The user 51 proactively plans and inputs departure timing data into a vehicle system of the vehicle 1. This may relate to action 201 above.
2. When the departure time is approaching, the control unit 70 starts to warm the aftertreatment system 40 to prepare the vehicle 1 for departure. This may relate to action 202 above.
3. The control unit 70 logs over time, e.g., to the storage medium 60, whether or not the aftertreatment system 40 was proactively and correctly heated prior to departure of the vehicle 1, and whether or not the actual departure time corresponds well in time with the inputted departure timing data. This may relate to action 205 above.
4. If the user 51 is consistently proactive with inputting departure timing data which are proven to be correct with respect to the actual departure time, e.g. as logged in step 3, the control unit 70 provides the user 51 with a performance increase, e.g. as in action 207 above.

Embodiments herein may relate to maintaining statistics, e.g., in the storage medium 60, of how often and/or how consistently the planned departure timing data, if any, corresponds to the actual vehicle departure time(s). In some embodiments this may be implemented by any suitable logic implemented in a control unit, e.g., the control unit 70, e.g., using a temperature of the aftertreatment system 40 at start of the combustion engine 30, and/or any other suitable input. This may e.g. be part of pre-heating statistics in action 206 above. Some embodiments herein may also maintain statistics, e.g., in the storage medium 60, related to whether or not the user 51 waits long enough to allow the aftertreatment system 40 to pre-heat before departing when powering up the vehicle 1 if not having entered predictive departure data. This may e.g., be part of pre-heating statistics in action 206 above.

In some further embodiments herein, when pre-heating the aftertreatment system 40, any other suitable units comprised in the vehicle 1 may also be pre-heated. For example, the combustion engine 30 may be pre-heated alongside pre-heating the aftertreatment system 40. In this way further benefits may be realized such as improving the lifetime and/or performance of the combustion engine 30.

To perform the method actions described herein, the control unit 70 may be configured to perform any one or more of the above actions 201-207 or any of the other examples or embodiments herein. The control unit 70 may for example comprise an arrangement depicted in FIGS. 3*a* and 3*b*. The control unit 70 may be in connection with a pre-heating process of an aftertreatment system 40 for a combustion engine 30. For example, the control unit 70 may control the pre-heating process, e.g., using the pre-heating unit 42. The control unit 70 may comprise an input and output interface 300 configured to communicate with the entities of embodiments herein, such as e.g., any one or more out of the aftertreatment system 40, the combustion engine 30, the pre-heating unit 42, the wireless device 52, the storage medium 60, and any other suitable device or component comprised in the vehicle 1.

The input and output interface 300 may comprise a wireless and/or wired receiver (not shown) and a wireless and/or wired transmitter (not shown), e.g., for communication with and/or control of any of the above named entities.

The control unit 70 may be configured to, e.g., by means of an obtaining unit 301 in the control unit 70, obtain a scheduled start time of the combustion engine 30.

The control unit 70 may be configured to, e.g., by means of the obtaining unit 301 in the control unit 70, obtain pre-heating statistics indicating whether or not the one or more success criteria was fulfilled at one or more previous starts of the combustion engine 30.

The control unit 70 may be configured to, e.g., by means of a scheduling unit 302 in the control unit 70, schedule a pre-heating of the aftertreatment system 40 to be completed before the scheduled start time.

The control unit 70 may be configured to, e.g., by means of a detecting unit 303 in the control unit 70, detect a start of the combustion engine 30 at an actual start time.

The control unit 70 may be configured to, e.g., by means of a determining unit 304 in the control unit 70, in response to the detected start of the combustion engine 30, and using the actual and scheduled start time, determine whether the scheduled pre-heating of the aftertreatment system 40 fulfils one or more success criteria.

The control unit 70 may be configured to, e.g., by means of a logging unit 305 in the control unit 70, log whether or not the one or more success criteria are fulfilled.

The control unit 70 may be configured to, e.g., by means of a triggering unit 306 in the control unit 70, when the one or more success criteria are fulfilled, trigger a performance increase of the combustion engine 30.

Figure 3A:
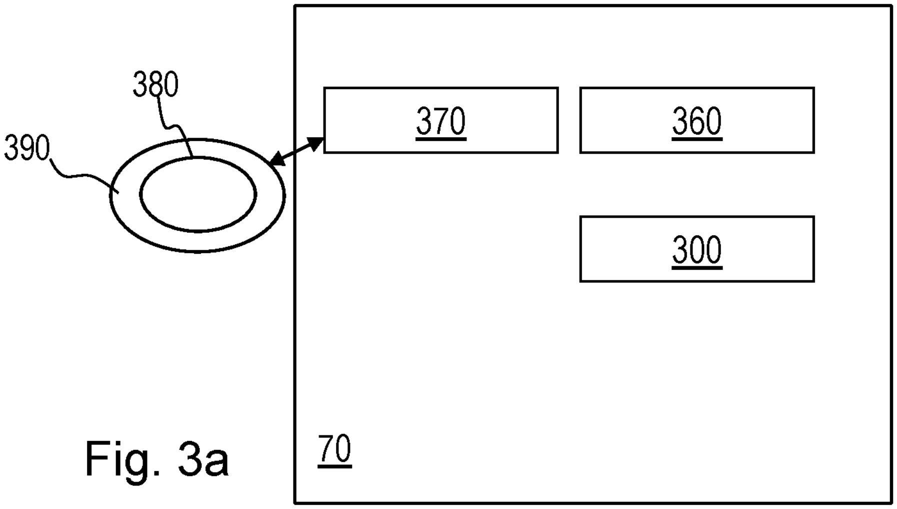
FIGS. 3*a-b* are schematic block diagrams illustrating a control unit according to embodiments herein.
Figure 3B:
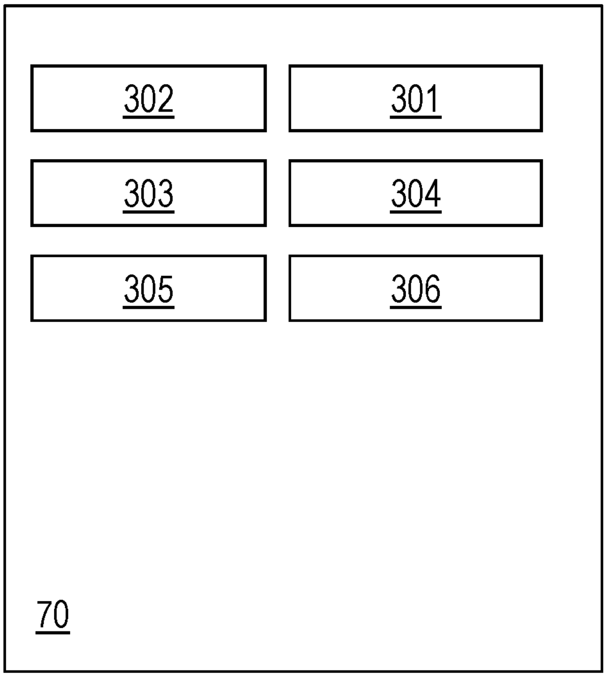

The embodiments herein may be implemented through a processor or one or more processors, such as the processor 360 of a processing circuitry in the control unit 70 depicted in FIG. 3*a*, together with computer program code for performing the functions and actions of the embodiments herein. The program code mentioned above may also be provided as a computer program medium, for instance in the form of a data computer readable medium carrying computer program code for performing the embodiments herein when being loaded into the control unit 70. One such computer readable medium may be in the form of a memory stick. The computer program code may furthermore be provided as pure program code on a server and downloaded to the control unit 70.

The control unit 70 may further comprise a memory 370 comprising one or more memory units. The memory 370 comprises instructions executable by the processor in control unit 70. The memory 370 is arranged to be used to store e.g., information, indications, data, configurations, functions, models, pre-heating statistics, success criteria, and applications to perform the methods herein when being executed in the control unit 70. The memory 360 may in some embodiments comprise the storage medium 60.

In some embodiments, a computer program 380 comprises instructions, which when executed by a computer, e.g., the at least one processor 360, cause the at least one processor of the control unit 70 to perform the actions 201-207 above.

In some embodiments, a computer-readable storage medium 390 comprises the respective computer program 380. The computer-readable storage medium 390 may comprise program code for performing the steps of any one of actions 201-207 above when said program product is run on a computer, e.g., the at least one processor 360.

Those skilled in the art will appreciate that the units in the control unit 70 described above may refer to a combination of analogue and digital circuits, and/or one or more processors configured with software and/or firmware, e.g., stored in the control unit 70, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

It is to be understood that the present invention is not limited to the embodiments described above and illustrated in the drawings; rather, the skilled person will recognize that many changes and modifications may be made within the scope of the appended claims.

What is claimed is:

1. A method performed by a control unit in connection with a pre-heating process of an aftertreatment system for a combustion engine, the method comprising:

obtaining a scheduled start time of the combustion engine, scheduling a pre-heating of the aftertreatment system to be completed before the scheduled start time, detecting a start of the combustion engine at an actual start time, in response to the detected start of the combustion engine, and using the actual and scheduled start times, determining whether the scheduled pre-heating of the aftertreatment system fulfils one or more success criteria, when the one or more success criteria are fulfilled, triggering a performance increase of the combustion engine.

2. The method according to claim 1, wherein the one or more success criteria comprise at least one of:

a temperature of the aftertreatment system is above a predetermined threshold temperature at the actual start time, and the actual start time is later than or coincides with the scheduled start time.

3. The method according to claim 1, wherein triggering the performance increase comprises triggering any one or more out of:

an increase of engine power, an increase of engine speed, and an increase of engine torque.

4. The method according to claim 1, further comprising:

obtaining pre-heating statistics indicating whether or not the one or more success criteria was fulfilled at one or more previous starts of the combustion engine, and wherein triggering the performance increase is further based on the obtained pre-heating statistics.

5. The method according to claim 4, wherein the pre-heating statistics comprises any one or more out of:

one or more previous scheduled start times, one or more previous actual start times, and one or more previous temperatures of the aftertreatment system at respective actual start times.

6. The method according to claim 4, wherein the pre-heating statistics comprises information about a share of pre-heating processes of the aftertreatment system fulfilling the one or more success criteria at the one or more previous starts of the combustion engine.

7. The method according to claim 1, further comprising:

logging whether or not the one or more success criteria are fulfilled.

8. The method according to claim 7 wherein logging whether or not the one or more success criteria are fulfilled further comprises logging any one or more out of:

the scheduled start time, the actual start time, and the temperature of the aftertreatment system at the actual start time.

9. The method according to claim 1, wherein obtaining the scheduled start time comprises receiving the scheduled start time from a wireless device.

10. A control unit configured to perform the method according to claim 1.

11. A vehicle comprising a control unit according to claim 10, a combustion engine, and an aftertreatment system.

12. The vehicle according to claim 11, wherein the aftertreatment system is arranged to reduce particles and/or nitrogen oxide, NOx, emissions of exhaust gases produced by the combustion engine.

13. The vehicle according to claim 10, wherein the vehicle is any one out of a truck, a car, a bus, and a construction equipment vehicle.

14. A computer program comprising program code means for performing the steps of claim 1 when said program is run on a computer.

15. A computer readable medium carrying a computer program comprising program code means for performing the steps of claim 1 when said program is run on a computer.

* * * * *